(12) United States Patent
North

(10) Patent No.: US 9,996,378 B2
(45) Date of Patent: *Jun. 12, 2018

(54) MANAGING A CHECK-POINT BASED HIGH-AVAILABILITY BACKUP VIRTUAL MACHINE

(71) Applicant: INTERNATIONAL BUSINESS MACHINES CORPORATION, Armonk, NY (US)

(72) Inventor: Geraint North, Manchester (GB)

(73) Assignee: International Business Machines Corporation, Armonk, NY (US)

(*) Notice: Subject to any disclaimer, the term of this patent is extended or adjusted under 35 U.S.C. 154(b) by 219 days.

This patent is subject to a terminal disclaimer.

(21) Appl. No.: 14/868,559

(22) Filed: Sep. 29, 2015

(65) Prior Publication Data

US 2016/0019107 A1 Jan. 21, 2016

Related U.S. Application Data

(63) Continuation of application No. 14/110,733, filed on Oct. 9, 2013, now Pat. No. 9,448,895.

(51) Int. Cl.
| | |
|---|---|
| G06F 11/00 | (2006.01) |
| G06F 9/455 | (2018.01) |
| G06F 11/07 | (2006.01) |
| G06F 11/14 | (2006.01) |
| G06F 11/20 | (2006.01) |

(52) U.S. Cl.
CPC ...... *G06F 9/45558* (2013.01); *G06F 11/0712* (2013.01); *G06F 11/0793* (2013.01); *G06F 11/1438* (2013.01); *G06F 11/1484* (2013.01); *G06F 11/202* (2013.01); *G06F 2201/84* (2013.01)

(58) Field of Classification Search
CPC ............ G06F 11/1484; G06F 11/1438; G06F 11/0712; G06F 11/0793; G06F 11/202; G06F 9/45558; G06F 2201/84
USPC .......................................................... 714/15
See application file for complete search history.

(56) References Cited

U.S. PATENT DOCUMENTS

| | | | |
|---|---|---|---|
| 6,691,250 B1 * | 2/2004 | Chandiramani | G06F 11/079 |
| | | | 714/15 |
| 7,213,246 B1 * | 5/2007 | van Rietschote | G06F 11/1482 |
| | | | 707/999.202 |

(Continued)

*Primary Examiner* — Yair Leibovich
(74) *Attorney, Agent, or Firm* — Michael R. Long; Steven L. Bennett

(57) ABSTRACT

A technique for failure monitoring and recovery of a first application executing on a first virtual machine includes storing machine state information during execution of the first virtual machine at predetermined checkpoints. An error message that includes an application error state at a failure point of the first application is received, by a hypervisor, from the first application. The first virtual machine is stopped in response to the error message. The hypervisor creates a second virtual machine and a second application from the stored machine state information that are copies of the first virtual machine and the first application. The second virtual machine and the second application are configured to execute from a checkpoint preceding the failure point. In response to receipt of a failure interrupt by the second application, one or more recovery processes are initiated in an attempt to avert the failure point.

9 Claims, 19 Drawing Sheets

(56) References Cited

U.S. PATENT DOCUMENTS

| | | | |
|---|---|---|---|
| 9,448,895 B2* | 9/2016 | North | G06F 11/1438 |
| 2010/0037096 A1* | 2/2010 | Bum | G06F 11/1438 |
| | | | 714/19 |
| 2012/0144233 A1* | 6/2012 | Griffith | G06F 11/1443 |
| | | | 714/13 |

* cited by examiner

Application 32. Error 110. Failure point X.
Recovery Record Template 54

| No. | Recovery Methods | Severity | Time stamp |
|---|---|---|---|
| 1 | Cancel transactions 1 | 1 | |
| 2 | Cancel transaction 2 | 2 | |
| 3 | Cancel transaction 3 | 3 | |
| 4 | Flush caches | 3 | |
| 5 | Safe mode | 3 | |
| 6 | Discard data structures | 3 | |

Application 32. Error 120. Failure point X.
Recovery Record Template 55

| No. | Recovery Methods | Severity | Time stamp |
|---|---|---|---|
| 1 | Flush caches1 | 1 | |
| 2 | Flush caches2 | 2 | |
| 3 | Discard data structures1 | 1 | |
| 4 | Discard data structures2 | 2 | |
| 5 | Cancel transaction3 | 3 | |
| 6 | Safe mode | 3 | |

Figure 9

| Application Registration Table 42A |||
|---|---|---|
| App. | Error | Time after checkpoint |
| 32 | Error 120 | X+30 |
| | | |
| | | |

Recovery Record 54A: Application 32. Error 120. Failure point Checkpoint X+30 sec

| No. | Recovery Methods | Severity | Timestamp |
|---|---|---|---|
| 1 | Cancel transactions 1 | 1 | |
| 2 | Cancel transaction 2 | 2 | |
| 3 | Cancel transaction 3 | 3 | |
| 4 | Flush caches | 3 | |
| 5 | Safe mode | 3 | |
| 6 | Discard data structures | 3 | |

Figure 10A

| Recovery Record 54A: Application 32. Error 120. Failure point Checkpoint X+30 sec | | | |
|---|---|---|---|
| No. | Recovery Methods | Severity | Timestamp |
| 1 | Cancel transactions 1 | 1 | 16/3/2011 X+20; |
| 2 | Cancel transaction 2 | 2 | |
| 3 | Cancel transaction 3 | 3 | |
| 4 | Flush caches | 3 | |
| 5 | Safe mode | 3 | |
| 6 | Discard data structures | 3 | |

| Application Registration Table 42A | | |
|---|---|---|
| App. | Error | Time after last checkpoint |
| 32 | Error 120 | X+30 |
| | | |
| | | |
| | | |
| | | |

Figure 10B

| Recovery Record 54A: Application 32. Error 120. Failure point Checkpoint X+30 sec | | | |
|---|---|---|---|
| No. | Recovery Methods | Severity | Timestamp |
| 1 | Cancel transactions 1 | 1 | 16/3/2011 X+20; 17/3/2011 X+22 |
| 2 | Cancel transaction 2 | 2 | |
| 3 | Cancel transaction 3 | 3 | |
| 4 | Flush caches | 3 | |
| 5 | Safe mode | 3 | |
| 6 | Discard data structures | 3 | |

| Application Registration Table 42A | | |
|---|---|---|
| App. | Error | Time after last checkpoint |
| 32 | Error 120 | X+30 |
| 32 | Error 120 | X+32 |
| | | |
| | | |
| | | |

Figure 10C

| Recovery Record 54A: Application 32, Error 120, Failure point Checkpoint X+30 sec | | | |
|---|---|---|---|
| No. | Recovery Methods | Severity | Timestamp |
| 1 | Cancel transactions 1 | 1 | 16/3/2011 X+20; 17/3/2011 X+22 |
| 2 | Cancel transaction 2 | 2 | 17/3/2011 X+15 |
| 3 | Cancel transaction 3 | 3 | |
| 4 | Flush caches | 3 | |
| 5 | Safe mode | 3 | |
| 6 | Discard data structures | 3 | |

| Application Registration Table 42A | | |
|---|---|---|
| App. | Error | Time after last checkpoint |
| 32 | Transaction Error 120 | X+30 |
| 32 | Transaction Error 120 | X+32 |
| 32 | Transaction Error 122 | X+25 |

Figure 10D

| Application Registration Table 42A | | |
|---|---|---|
| App. | Error | Time after last checkpoint |
| 32 | Transaction Error 120 | X+30 |
| 32 | Transaction Error 120 | X+32 |
| 32 | Transaction Error 122 | X+25 |
| 32 | Transaction Error 123 | X+35 |

| Recovery Record 54A: Application 32. Error 120. Failure point Checkpoint X+30 sec | | | |
|---|---|---|---|
| No | Recovery Methods | Severity | Timestamp |
| 1 | Cancel transactions 1 | 1 | 16/3/2011 X+20; 17/3/2011 X+22 |
| 2 | Cancel transaction 2 | 2 | 17/3/2011 X+15 |
| 3 | Cancel transaction 3 | 3 | 17/3/2011 X+25 |
| 4 | Flush caches | 3 | |
| 5 | Safe mode | 3 | |
| 6 | Discard data structures | 3 | |

Figure 10E

MANAGING A CHECK-POINT BASED HIGH-AVAILABILITY BACKUP VIRTUAL MACHINE

This application is a continuation of U.S. patent application Ser. No. 14/110,733 entitled "TECHNIQUES FOR MANAGING A CHECK-POINT BASED HIGH-AVAILABILITY BACKUP VIRTUAL MACHINE," filed Oct. 9, 2013, which is a National Stage of International Application No. PCT/IB2012/051883 (which has a priority date of Apr. 21, 2011), entitled "VIRTUAL MACHINE HIGH-AVAILABILITY," filed Apr. 16, 2012. The disclosure of U.S. patent application Ser. No. 14/110,733 is hereby incorporated herein by reference in its entirety for all purposes.

BACKGROUND

This application is generally directed to virtual machines and, more particularly, to managing checkpoint-based high-availability of backup virtual machines in the event of a failure of a primary virtual machine.

Computing is typically thought of in terms of an application and a supporting platform. A supporting platform typically includes a hardware infrastructure of one or more processor cores, input/output, memory, and fixed storage (the combination of which supports an operating system (OS), which in turn supports one or more applications). Applications are typically self-contained bundles of logic relying on little other than core object files and related resource files. As computing has become integral to modern industry, applications have become co-dependent on the presence of other applications. That is, the requisite environment for an application includes not only an underlying OS and supporting hardware platform, but also other key applications. Key applications may include application servers, database management servers, collaboration servers, and communicative logic commonly referred to as middleware.

Given the complexity of application and platform interoperability, different combinations of applications executing in a single hardware platform can demonstrate differing degrees of performance and stability. Virtualization technology aims to interject a layer between a supporting platform and executing applications. From the perspective of business continuity and disaster recovery, virtualization provides the inherent advantage of environment portability. Specifically, to move an entire environment configured with multiple different applications is a matter of moving a virtual image from one supporting hardware platform to another. Further, more powerful computing environments can support the coexistence of multiple different virtual images, all the while maintaining a virtual separation between the images. Consequently, a failure condition in one virtual image typically cannot jeopardize the integrity of other co-executing virtual images in the same hardware platform.

A virtual machine monitor (VMM) or hypervisor manages the interaction between each virtual image and underlying resources provided by a hardware platform. In this regard, a bare metal hypervisor runs directly on the hardware platform, much as an OS runs directly on hardware. By comparison, a hosted hypervisor runs within a host OS. In either case, a hypervisor can support the operation of different guest OS images, known as virtual machine (VM) images. The number of VM images is limited only by the processing resources of a VM container that holds the VM images or the hardware platform. Virtualization has proven especially useful for end-users that require separate computing environments for different types of applications, while being limited to a single hardware platform.

For example, it is well known for a primary OS native to one type of hardware platform to provide a virtualized guest OS native to a different hardware platform (so that applications requiring the presence of the guest OS can co-exist with other applications requiring the presence of the primary OS). In this way, the end-user need not provide separate computing environments to support different types of applications. Regardless of the guest OS, access to underlying resources of the single hardware platform remains static. Virtualized environments have been deployed to aggregate different interdependent applications in different VMs in composing application solutions. For example, an application server can execute within one VM while a database management system executes in a different VM and a web server executes in yet another VM. Each of the VMs can be communicatively coupled to one another in a secure network and any given deployment of the applications can be live migrated to a different deployment without interfering with the execution of the other applications in the other VMs.

In a typical live migration, a VM can be moved from one host server to another host server in order to, for example, permit server maintenance or to permit an improvement in hardware support for the VM. Checkpoint-based high-availability is a technique in which a VM running on a primary host machine mirrors its processor and memory state every period (e.g., 25 mS) onto a secondary host machine. The mirroring process involves: tracking changes to the memory and processor state of the primary VM; periodically stopping the primary VM; sending the changes over a network to the secondary host machine; waiting for the secondary host machine to acknowledge receipt of the memory and processor state update; and resuming the primary VM. The mirroring process ensures that the secondary host machine is able to resume the workload with no loss of service should the primary host machine suffer a sudden hardware failure.

If the secondary host machine either notices that the primary host machine is not responding or receives an explicit notification from the primary host machine, the secondary host machine starts the mirrored version of the VM and the appearance to the outside world is that the VM seamlessly continued to execute across the failure of the primary host machine. Although this technique provides effective protection against hardware failure, it does not protect against software failure. Because the state of the memory and processor of the primary VM is faithfully reproduced on the secondary host machine, if a software crash (for example, the de-reference of a null pointer) causes a failover to the secondary host machine, the VM would resume execution from the last checkpoint and, if the program execution is deterministic, the same error will occur.

There are some constrained cases in which a VM may not crash if software failure triggered a failover. However, these cases are few and far between, and rely more on luck than design. For example, a software bug that manifested as a race condition in which one processor could access data that was being modified by another processor might not occur when the workload was resumed on the secondary host machine, as by a fluke of scheduling the data may not end up being concurrently accessed. Implementing checkpoint availability with VMs is known. For example, a publication entitled "IMPLEMENTATION AND EVALUATION OF A SCALABLE APPLICATION-LEVEL CHECKPOINT-RECOVERY SCHEME FOR MPI PROGRAMS", by Greg Bronevetsky et al., attempts to address the checkpoint availability problem that running times of many computer applications are much longer than the mean-time-to-failure of current high-performance computing platforms.

SUMMARY

A technique for failure monitoring and recovery of an application executing on a virtual machine includes executing, by a first virtual machine executing on a data processing system, a first application. Machine state information is stored, on a data storage device of the data processing system, during execution of the first virtual machine at predetermined checkpoints. An error message that includes an application error state at a failure point of the first application is received from the first application. The first virtual machine is stopped by a hypervisor in response to the error message. A copy of the first virtual machine and the first application is created by the hypervisor from the stored machine state information. The virtual machine copy corresponds to a second virtual machine and the application copy corresponds to a second application. The second virtual machine and the second application are configured to execute from a checkpoint preceding the failure point. A failure interrupt is sent from the hypervisor to the second application before the failure point is reached. In response to receipt of the failure interrupt by the second application, one or more recovery processes are initiated in an attempt to avert the failure point during execution of the second application.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 9 illustrates example recovery records configured according to the present disclosure; and FIGS. 10A-10E show changing states of an exemplary application registration table and recovery record for a same recurring failure.

DETAILED DESCRIPTION

Figure 1:
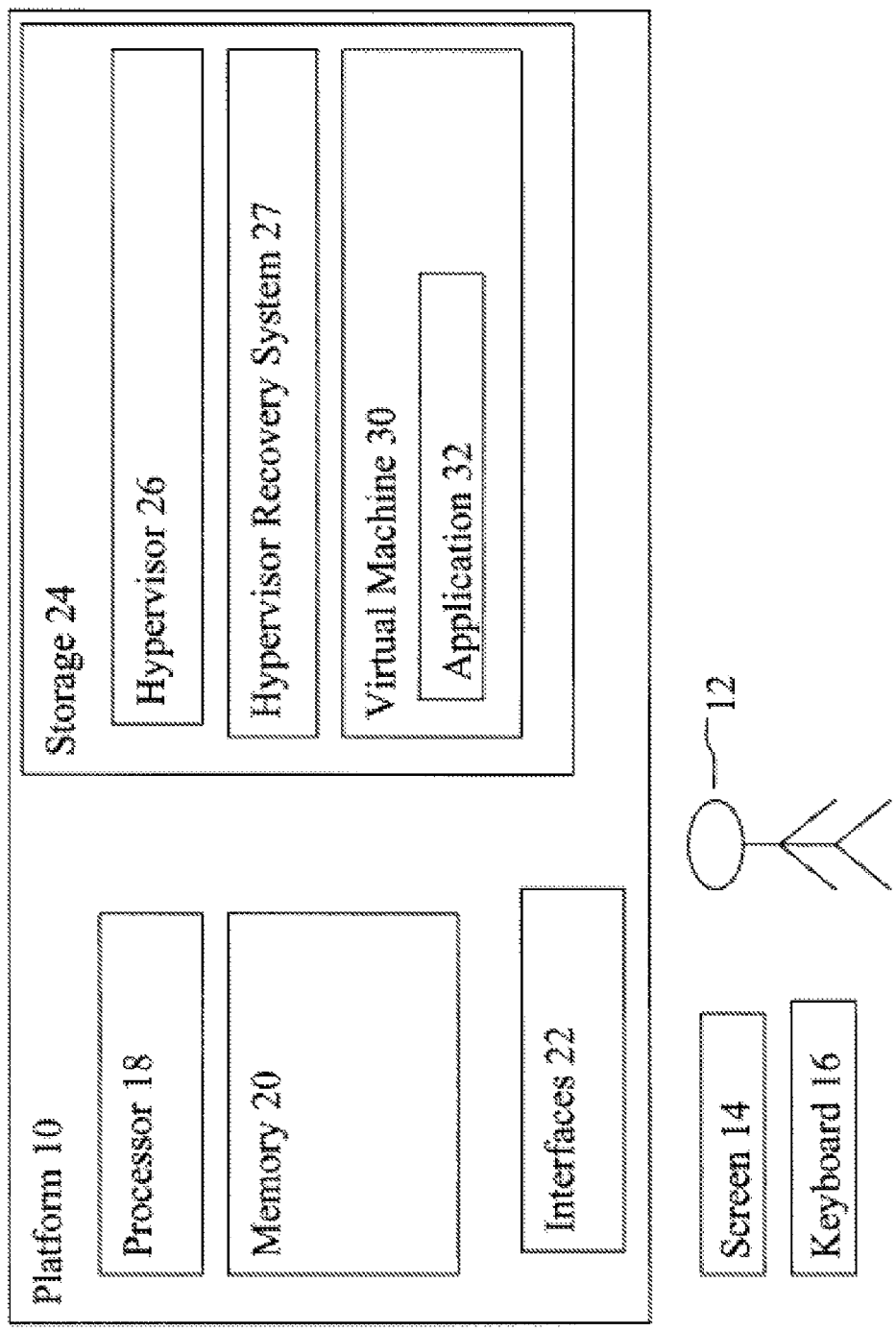
FIG. 1 is a diagram of a hardware platform.

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.) stored on a device, or an embodiment combining software and hardware aspects that may all generally be referred to herein as a circuit, module, or system. The present invention may, for example, take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein, the term "coupled" includes a direct electrical connection between elements or blocks and an indirect electrical connection between elements or blocks achieved using one or more intervening elements or blocks.

Virtual machine (VM) 'checkpoint and restart' techniques are described herein that augment an application at compile time to periodically save state at runtime such that the application can be restarted in the event of hardware failure. According to the present disclosure, an interrupt is introduced that can be delivered (e.g., by a hypervisor) to an application to warn it of an impending software crash. The interrupt is delivered to a copy of an application once an original application has crashed and the copy application has been resumed on a secondary host machine from a last checkpoint. The interrupt provides the application with details of the impending crash, so that the application can make best efforts to avoid the crash when executed on the secondary host machine. Unlike traditional checkpoint-based high-availability, there is value to be gained even if the primary and secondary host machines are actually implemented on a same physical system.

In the case the primary and secondary host machines are implemented on the same physical system, a VM will not be protected against hardware failure, but will be protected against software failure through the disclosed interrupt mechanism. The interrupt mechanism does not guarantee that the application can be saved from a software crash, but does provide a mechanism in which software application developers who wish to attempt a recovery in the event of a crash have flexibility to recover from a failure, since the interrupt mechanism provides a notice of impending failure when an application is still in a running state.

According to one or more embodiments, an additional interlock point is added to an existing migration control system. Viewed from a second aspect, the disclosure provides a system for failure monitoring and recovery that includes logic: that provides a VM with an application that executes in the VM; that stores machine state information from an executing first VM at regular checkpoints; that receives an error message from the application that includes an application error state at a failure point of the application; that stops the VM and application; that provides a first copy of the VM and application that executes from a checkpoint before the interrupt failure point; that sends a failure interrupt to the application copy before a corresponding failure point is reached; and that initiates, responsive to the failure interrupt, by the first application copy a first set of one or more recovery processes (or methods) in an attempt to escape a potential impending failure point.

Viewed from a further aspect, the disclosure provides a computer program product for failure monitoring and recovery. The computer program product includes a computer-readable storage device that is readable by a processor and stores instructions for execution, by the processor, the techniques disclosed herein. Viewed from a further aspect, the disclosure provides a computer program stored on a computer-readable storage device that is loadable into memory of a data processing system. When the computer program is executed, by the data processing system, the data processing system performs the techniques disclosed herein.

Platform 10, for interaction with user 12 using screen 14 and keyboard 16, is described with reference to FIG. 1 and may generally take the form of a data processing system. Platform 10 includes a processor 18, a memory 20, interfaces 22, and storage 24. An example of platform 10 is an IBM® PowerPC 750® Express server. Processor 18 takes instructions and data from memory 20 and performs logical operations on data according to the instructions. Examples of instructions include add data, subtract data, read data, and write data. An example of a processor is an IBM POWER7® processor. IBM, PowerPC 750, POWER, and POWER7 are trademarks of International Business Machines Corporation, registered in many jurisdictions worldwide.

Memory 20, which is faster than storage 24, is designed to not limit communication speed with operating processor 18. In various embodiments processor 18 has even faster cache memory for small parts of an application, but storage of a whole executing application is in memory 20. An example of memory is 8 gigabyte to 512 gigabyte registered dual in-line memory modules (RDIMM) including a series of dynamic random access memory (DRAM) integrated circuits. Interfaces 22 provide the gateway between platform 10 and user 12.

A keyboard input device sends information through an interface 22 to memory 20. Information is sent from memory 20 to an output device, such as a video monitor. Storage 24 is slower than memory 20 but is designed to hold more data than execution memory 20. An example of storage 24 is 8 terabyte SSF (Small Form Factor) SAS (Serial Attached SCSI) disk drive. As is known, small computer system interface (SCSI) is a computer bus used to move data to and from computer storage devices, such as hard drives. When platform 10 is not operating, memory 20 is empty and storage 24 persistently stores images of applications required to execute on platform 10. In the various embodiments, storage 24 stores: hypervisor 26; a hypervisor recovery system 27; virtual machine (VM) 30; and one or more applications 32. As noted above, a hypervisor may or may not need an underlying operating system (OS) depending on the type of hypervisor.

Figure 2:
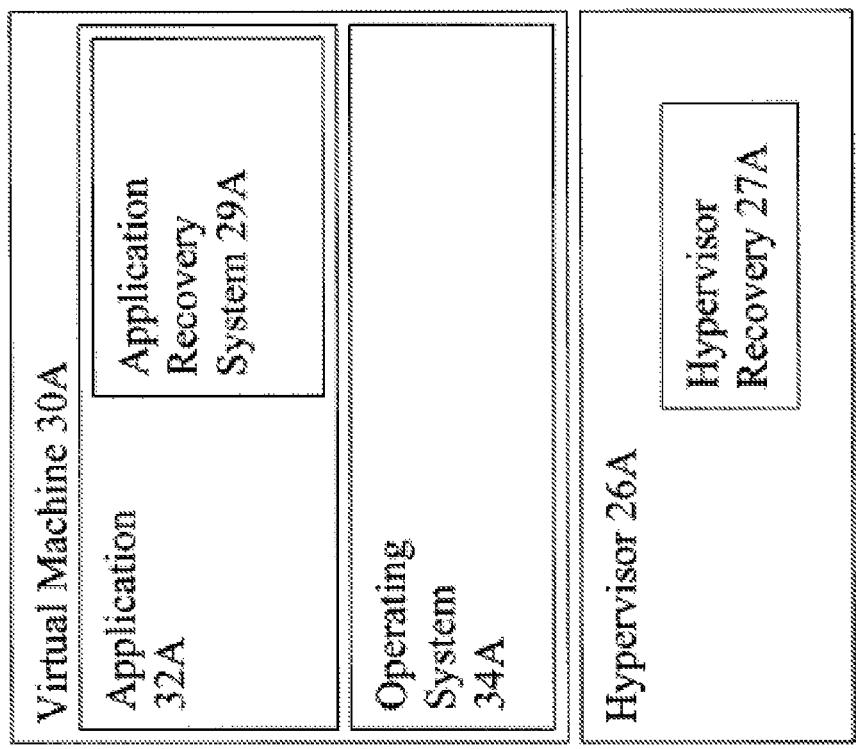
FIG. 2 is a diagram of an executing hypervisor environment.

With reference to FIG. 2, executing application(s) 32A, VM 30A, and hypervisor 26A are illustrated. VM 30A is the execution environment for operating system (OS) 34A and application 32A. Application 32A includes an application recovery system 29A. Hypervisor 26A includes program code instructions which, when loaded in executable memory and executed, instruct platform 10 to perform the logical operations of hypervisor 26A. Logical operations of hypervisor 26A include hypervisor recovery system 27A and VM 30A. Hypervisor recovery system 27A includes instructions which, when loaded into memory supervised by an active hypervisor 26A, instruct platform 10 and hypervisor 26A to perform the logical operations of failure and recovery system 27A.

VM 30A includes program code instructions which, when loaded into memory supervised by an active hypervisor 26A, instruct the platform and hypervisor to perform the logical operations of VM 30A. Logical operations of VM 30A include executing respective OS 34A and application 32A. Example application 32A includes program code instructions which, when loaded into memory supervised by active virtual machines 30A, instruct VM 30A to perform the logical operations of example application 32A.

Figure 3:
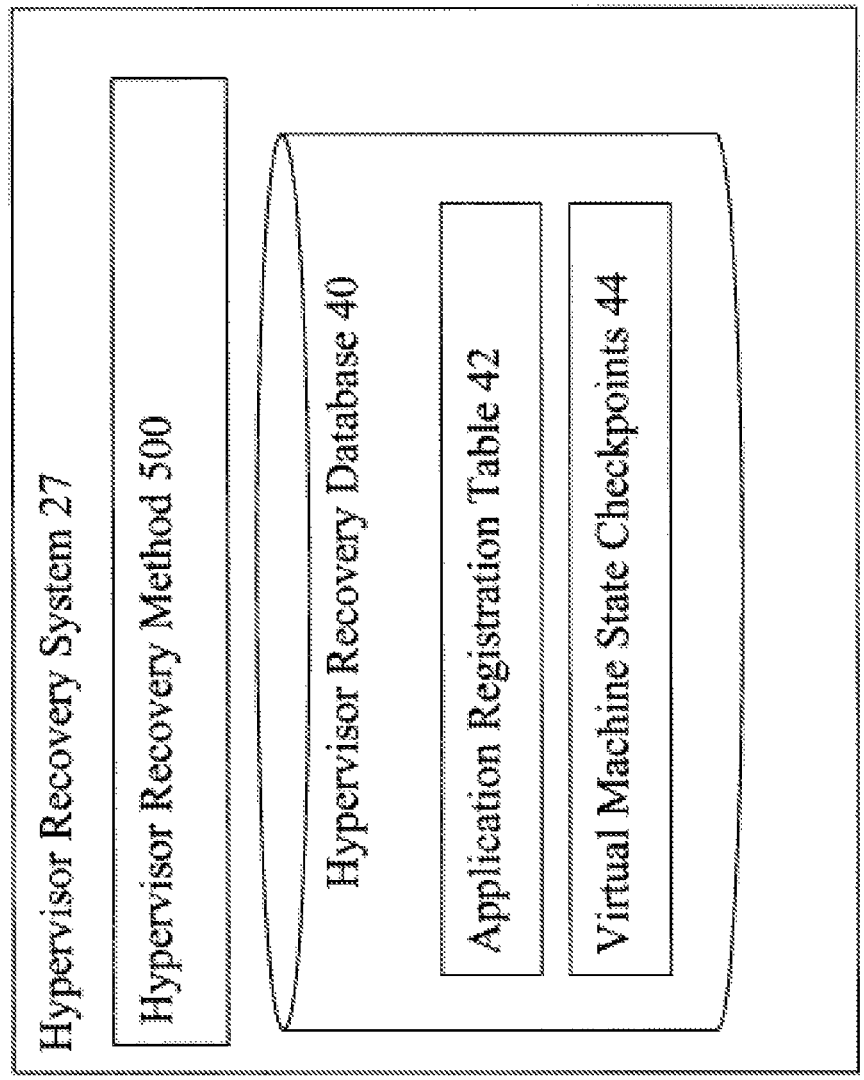
FIG. 3 is a diagram of a hypervisor recovery system configured according to the present disclosure.

With reference to FIG. 3, hypervisor recovery system 27 implements a hypervisor recovery process 500 and a hypervisor recovery database 40. Hypervisor recovery process 500 is described in more detail with respect to FIG. 5. Hypervisor recovery database 40 includes an application registration table 42 and virtual machine state checkpoints 44. Application registration table 42 includes a table of application records, with each application record including, for example, an application identifier, an error code, a checkpoint, and a time-after-checkpoint. An exemplary application registration table 42A is shown in FIGS. 10A-10E. The application identifier is an identifier for the application that is registered in recovery system 27. The error code is sent to recovery system 27 when an error occurs in an application. The checkpoint is the checkpoint before an error occurrence. The time-after-checkpoint is the time in seconds after the checkpoint when the error occurred. Virtual machine state checkpoints 44 include the memory and registers of a VM that are needed to reinstate the VM and any applications running on the VM at a particular moment in time.

Figure 4:
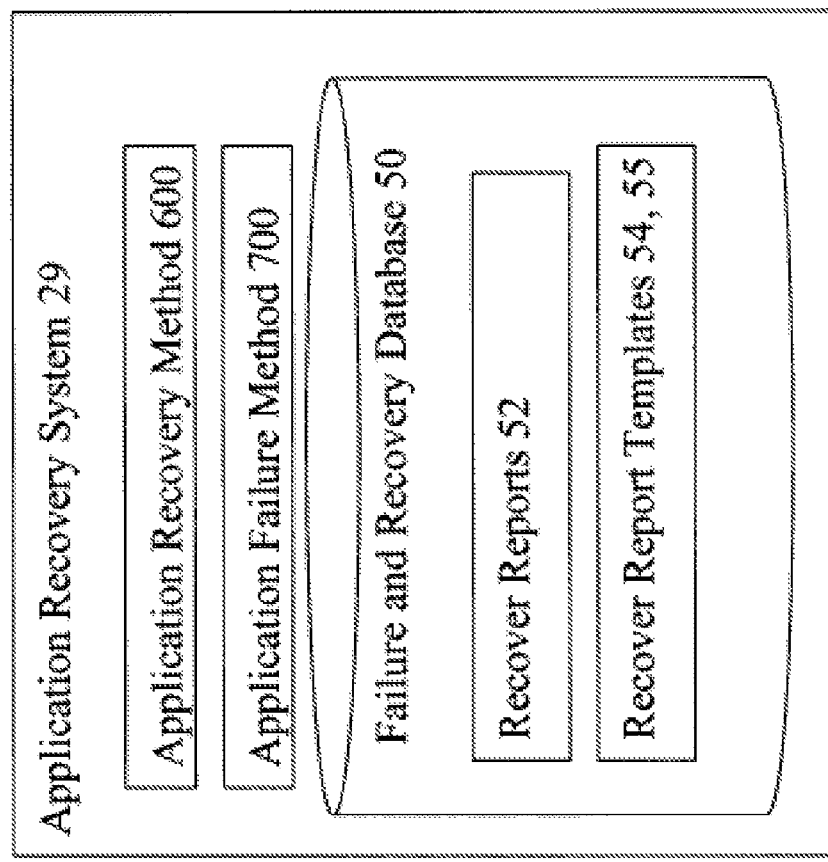
FIG. 4 is a diagram of an application recovery system configured according to the present disclosure.

With reference to FIG. 4, an application recovery system 29 includes an application recovery process 600, an application failure process 700, and an application recovery database 50. Application recovery process 600 is described in more detail with respect to FIG. 6. Application failure process 700 is described in more detail with respect to FIG. 7. Application recovery database 50 includes recovery reports 52 and recovery report templates 54 and 55. Examples of recovery report templates 54 and 55 are shown in FIG. 9. A recovery report is an instantiation of a recovery report template used to instruct application recovery system 29 to apply certain processes. A recovery report is also used to record results so that application recovery system 29 can adapt recovery processes after each failure.

Figure 5:
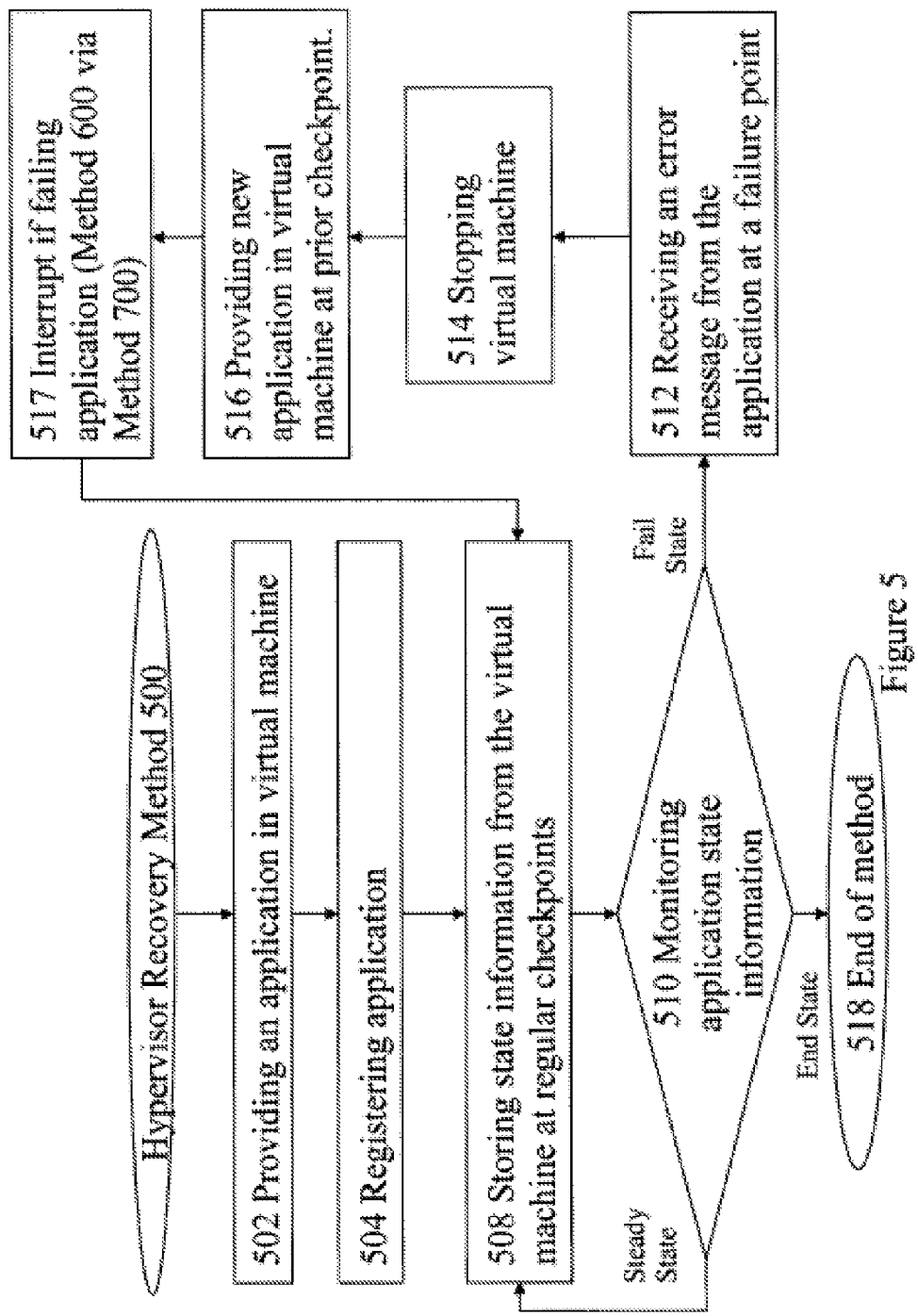
FIG. 5 is a flow chart of a hypervisor recovery process configured according to the present disclosure.

With reference to FIG. 5, an exemplary hypervisor recovery process 500 is described that executes on platform 10. At block 502 process 500 is initiated when platform 10 provisions an application and a VM. Next, at block 504 the application is registered (after a registration request is received from an application running on the VM). Assuming there is no existing entry in registration table 42, the name of the application is saved in registration table 42 and control passes to block 508. In block 508, state information for the VM is stored at regular checkpoints. Next in block 510, real-time state information is monitored for failure conditions.

Assuming a steady-state and no failures then periodically, depending on recovery settings, control passes from block 510 back to block 508 to store additional state information. If the application ends in block 510, control passes to block 518 where process 500 ends. If a failure of the application occurs in block 510, control passes to block 512. In block 512 an error message (including an error code and a failure point) is received from the application and application registration table 42 is populated with the information. Next, in block 514, the VM that is running the failed application is stopped. Then, in block 516, a new VM is provided for executing the failed application from a checkpoint prior to the interrupt. Next, in block 517 the last error message for an application that is already executing is determined.

A lookup in application registration table 42 reveals an error message and an indication at which point the error message was received. In one or more embodiments, the time after the last checkpoint is stored with the error message. An interrupt is sent to the application with the stored details of the last error including the indication when the error message was received. As one example, an interrupt may be named 'SIGCAREFUL'. From block 517 control returns to block 508 where additional checkpoints are stored and the new VM and application are monitored.

Figure 6:
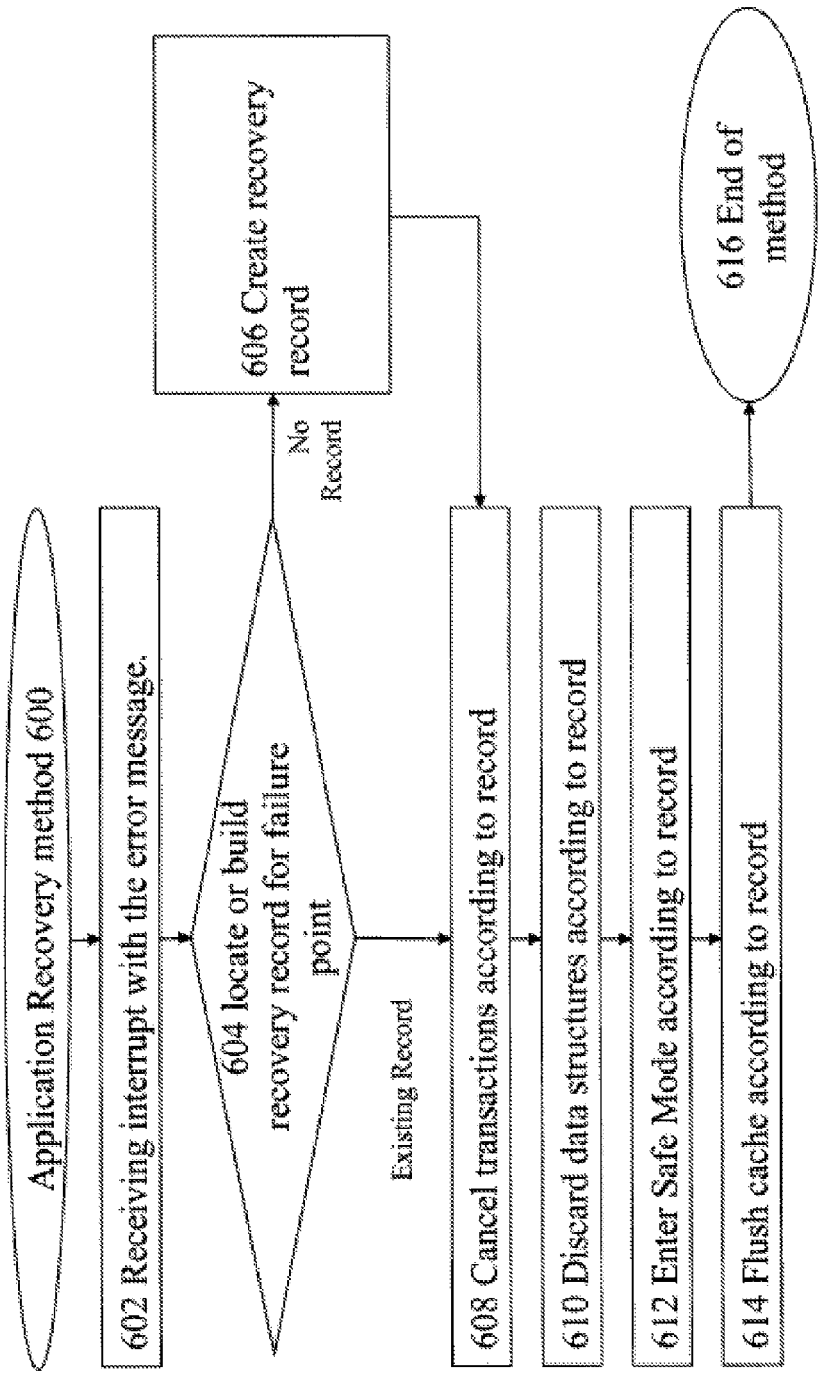
FIG. 6 is a flow chart of an application recovery process configured according to the present disclosure.

With reference to FIG. 6, an application recovery process 600 is initiated at block 602 when a new copy of application 32 is running on VM 30 (process 700) with hypervisor recovery system 27. In block 602 an interrupt with an error message and failure point is received. Next, in block 604 a recovery record is located or built for a failure point in an application. If a new record needs to be created, control transfers from block 604 to block 606. If a new record does not need to be created, control transfers from block 604 to block 608. A recovery record may be indexed by an error message and a failure point since similar errors can occur at different points in an application. A recovery record instructs application recovery process 600 to initiate one or more recovery processes. In block 606 a recovery record, which includes recovery processes that are selected for the error type, is created. For example, the recovered record may be created from a recovery record template that is selected based on the error message.

For example, memory intensive recovery processes may be selected for a memory error, storage intensive recovery processes may be selected for a storage error, transaction intensive recovery processes may be selected for transaction error, and network intensive recovery processes may be selected for a network error. Record templates may also be determined by what recovery processes are available. For example, new recovery processes can be added by adding new recovery record templates. Recovery processes in a recovery record may be prioritized according to error type. In one or more embodiments, recovery processes are first prioritized by the error message and then in order of doing the least damage.

Next, in block 608 transactions are cancelled according to the recovery record, which indicates whether or not to perform transaction cancellation. It should be appreciated that the number or level of transactions to cancel may be adjusted. Then, in block 610 data structures are discard according to the recovery record. Next, in block 612 a safe mode may be entered according to a recovery record. Then, in block 614, a cache may be flushed according to a recovery record. Following block 614, process 600 ends in block 616.

Figure 7:
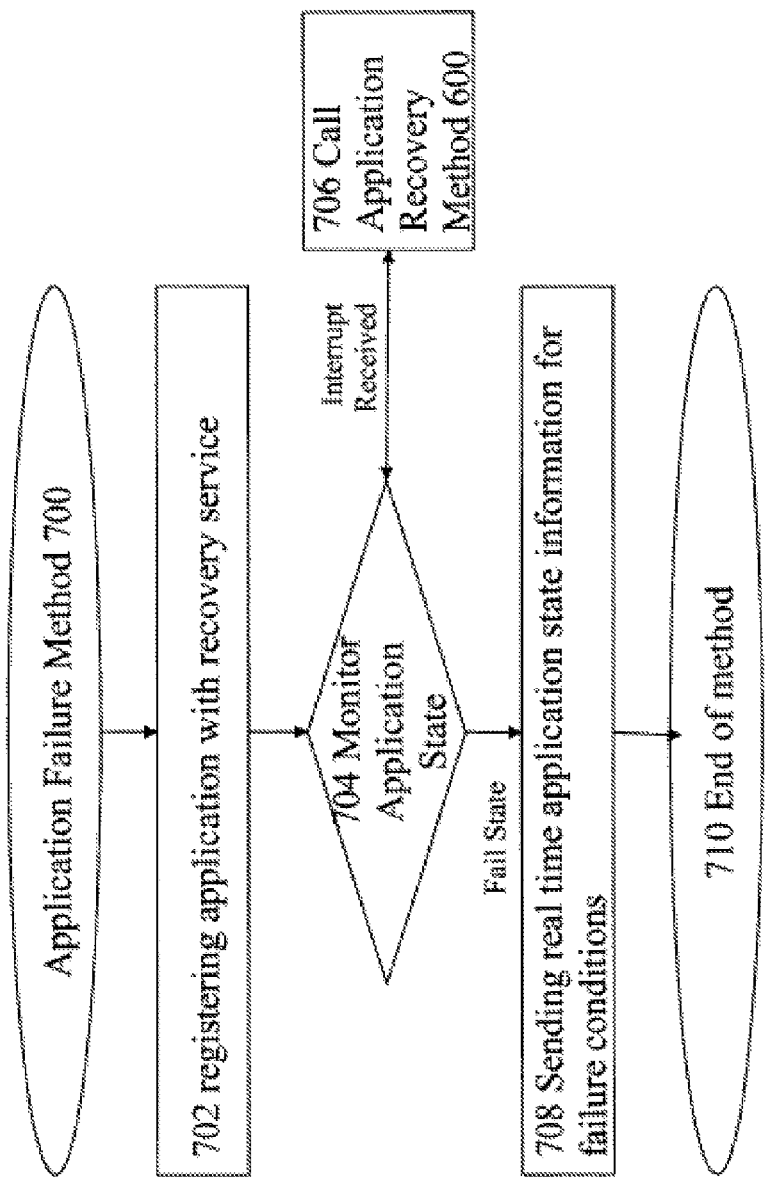
FIG. 7 is a flow chart of an application failure process configured according to the present disclosure.

With reference to FIG. 7, an exemplary application failure process 700 is illustrated. Process 700 is initiated in block 702 where an application 32 is registered with a recovery service running on hypervisor 26. Next, in block 704, a state of application 32 is monitored. In response to application 32 failing, control transfers from block 704 to block 708 where an application error and failure point associated with application 32 are sent to hypervisor 26. Following block 708 control transfers to block 710, where process 700 terminates (e.g., due to application 32 crashing). If an interrupt is received from hypervisor 26 in block 704, control transfers to block 706 where application recovery process 600 is called. It should be appreciated that block 706 is only reached after a copy of an application 32 and VM 30 is provided.

Figure 8A:
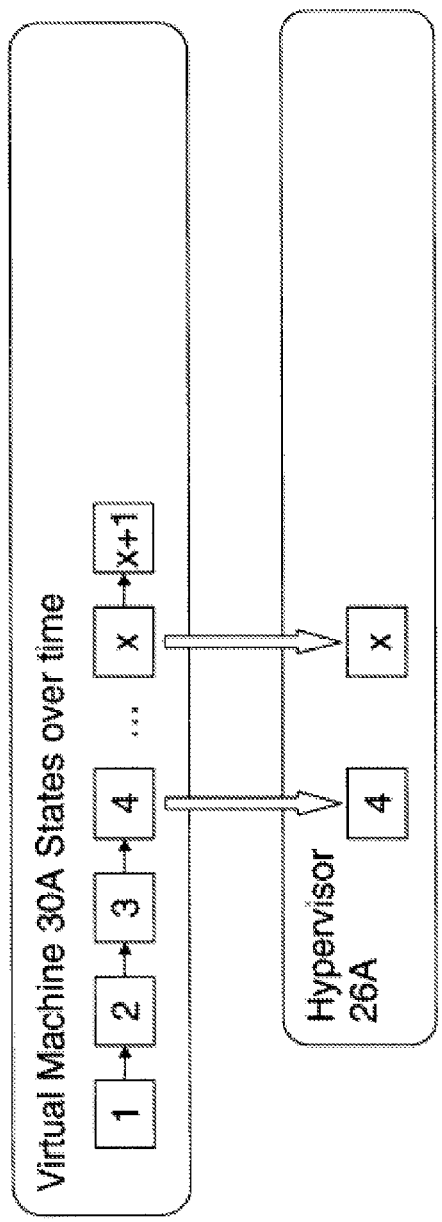
FIGS. 8A-8F are example state diagrams of virtual machine states over time according to the present disclosure.

With reference to FIGS. 8A-8F, exemplary VM states over time are illustrated, where state changes are enclosed within a dashed oval. FIG. 8A depicts VM 30A running on hypervisor 26A. As the application executes instruction, each instruction moves VM 30A from one memory state to another. A range of memory states are shown over a period of time: 1; 2; 3; 4; . . . x; and x+1. These memory states represent a full memory state of VM 30A. Periodically, the states are chosen as checkpoints and are saved in hypervisor 26A, for example, state 4 and state x. From these checkpoints, a full copy of VM 30A with currently executing application(s) 32A can be recreated. In various embodiments, application 32A is designed to support a failure interrupt ('SIGCAREFUL').

Figure 8B:
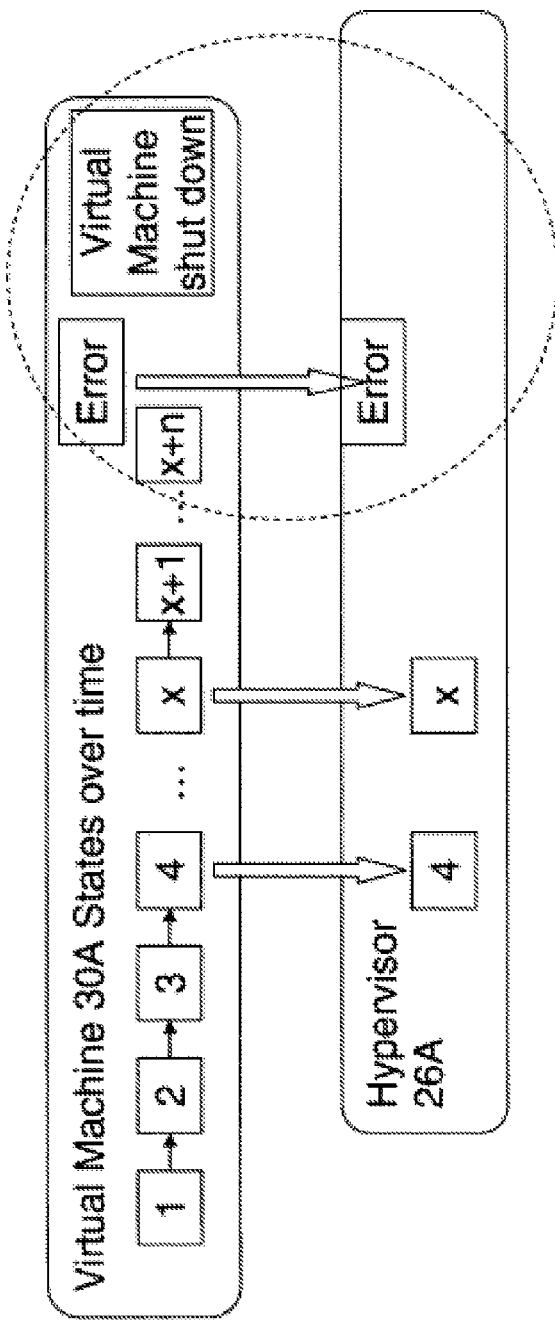
Figure 8C:
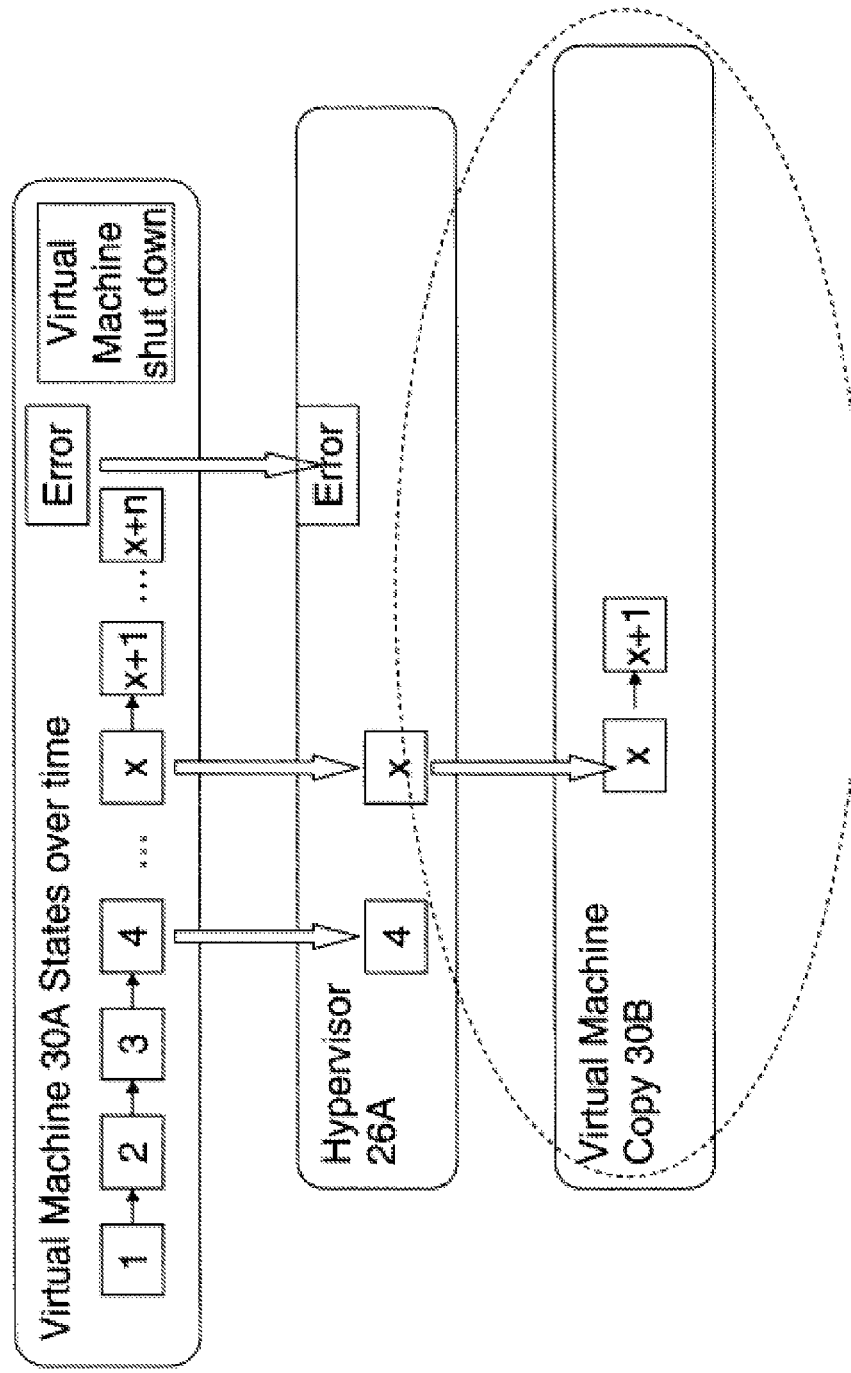

Application 32A registers for a failure service with hypervisor recovery system 27. In the event of a software crash in application 32A, in various embodiments, hypervisor 26A fails application 32A over to a backup (secondary) VM and then triggers the 'SIGCAREFUL' interrupt. FIG. 8B depicts a resulting error message being transferred to hypervisor 26A following an error that occurs after memory state 'x+n'. FIG. 8C depicts VM 30B, which is a copy of VM 30A, being initiated from checkpoint 'x'. VM 30B runs application 32B in the same state 'x' as on VM 30A. Application 32B executes and moves to state 'x+1'.

Figure 8D:
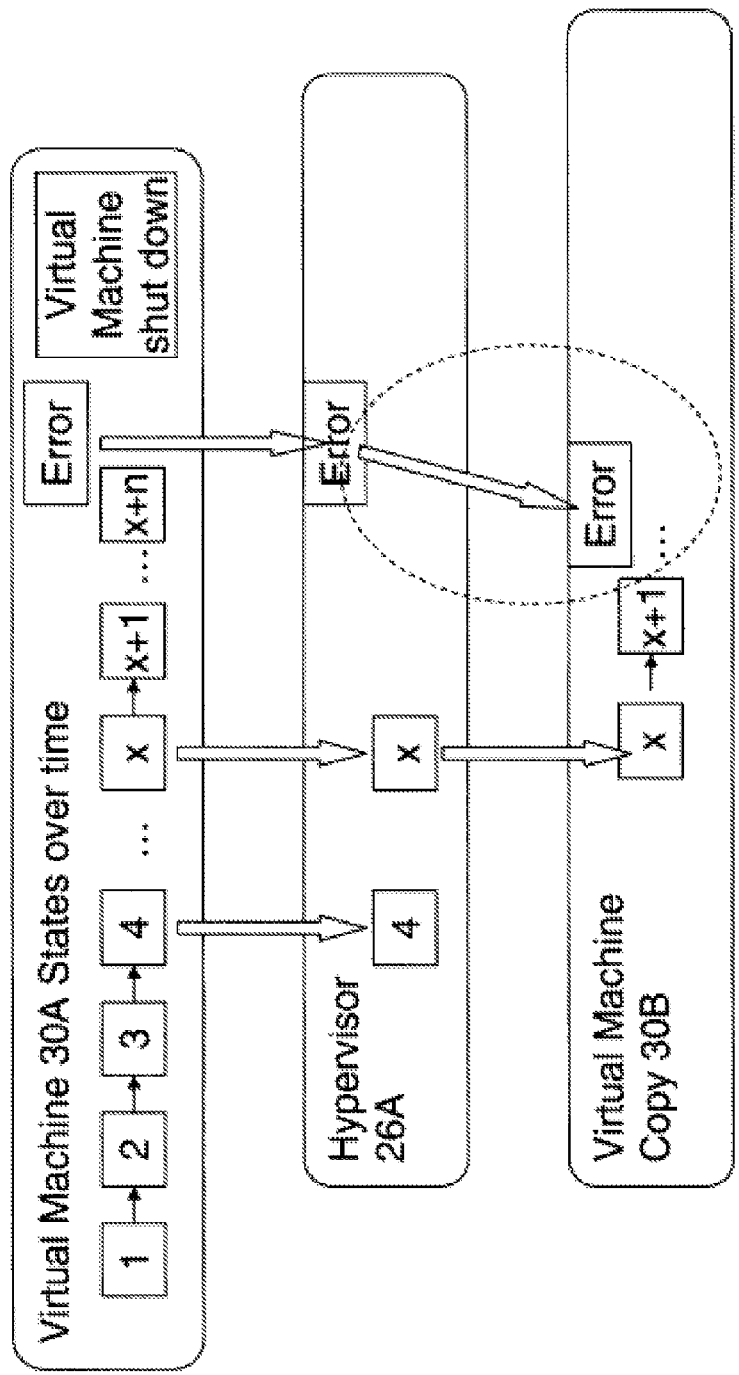
Figure 8E:
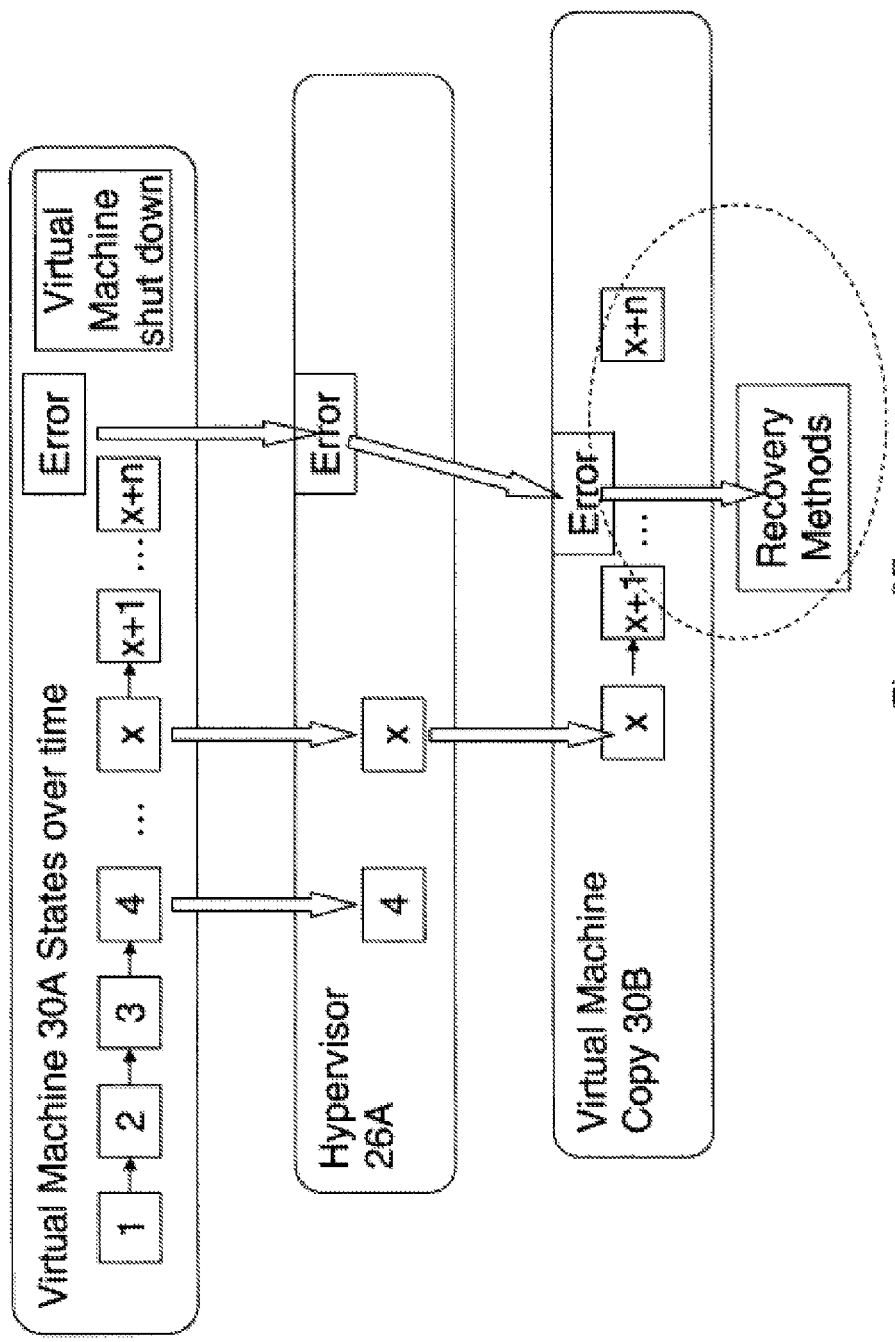

FIG. 8D depicts hypervisor 26A sending the 'SIGCAREFUL' interrupt to VM 30B, which receives the interrupt after the application reaches state 'x+1' but before the state where the corresponding error occurred (i.e., state 'x+n'). FIG. 8E depicts recovery processes being applied before the 'x+n' state. Application 32B can take whatever recovery steps are necessary to avoid the crash. In general, the recovery processes are particular to each application 32 and are controlled by associated recovery record templates. If an application 32 is told (by interrupt SIGCAREFUL) that is it going to be killed due to accessing an unmapped memory address, existing transactions can be aborted, caches flushed and as many data structures as possible discarded.

Figure 8F:
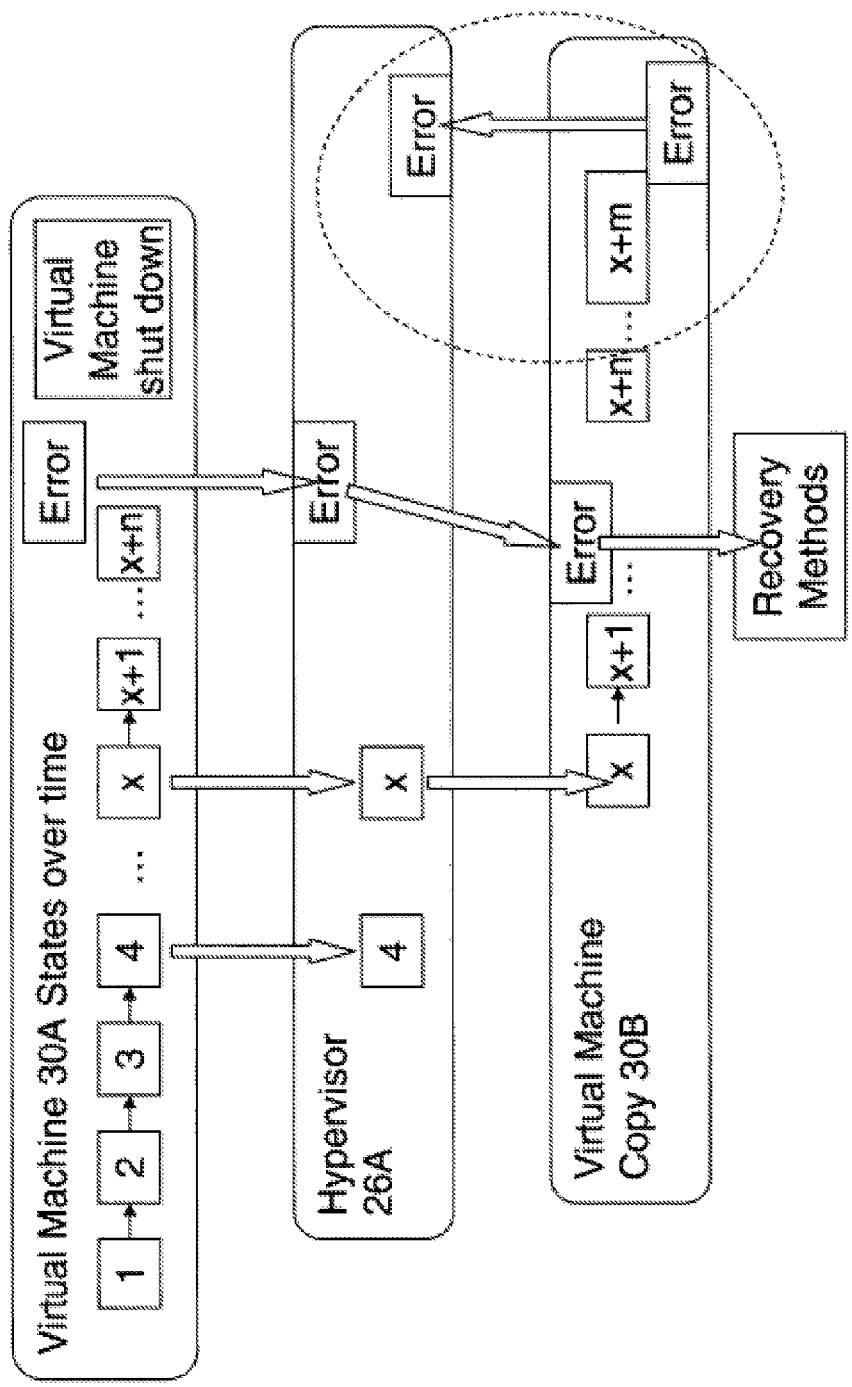

For example, if a Java® Virtual Machine is told that it is about to execute an illegal instruction, the Java® Virtual Machine can clear out its just-in-time (JIT) caches and revert to a slower bytecode interpreting mode. If an application 32 is told that it is going to be killed because an OS kernel cannot commit any more memory to it (i.e., if the system configuration allows processes to map more memory than the system has available in physical memory and swap), application 32 can reduce its memory usage by discarding caches of data or reducing the number of concurrent transactions it is processing. FIG. 8F depicts state 'x+m' and an additional error. Error details are sent to hypervisor 26A and the processes may be repeated. In this example, VM 30B advanced to a further state than VM 30A, which indicates the recovery processes had a positive effect.

With reference to FIG. 9, two exemplary recovery record templates 54 and 55 are illustrated. Templates 54 and 55 are particular to application 32 and include six recovery processes. Each record includes: a sequence number; a recovery (method) process; a recovery process severity; and a timestamp. The sequence number is the order in which the recovery process is applied. The record recovery process includes the name of recovery process that is to be called. This example is limited to four recovery processes. The record recovery process severity is a parameter that is applied to the recovery process when it is called. The illustrated example only has a single simple parameter corresponding to a simple recovery process, but multiple parameters including complex expressions can be used. The timestamp is recorded when the recovery process has been applied for a series of related failure points.

Template 54 is optimized for transaction error 110. Three different cancel transaction recovery processes are listed with an increasing level of severity. The cancel transaction recovery processes are followed by: a flush recovery process; a safe mode recovery process; and a discard data structure process. In operation, a recovery record template is selected for an error that occurs at a particular failure point (e.g., in time space). Each time the error and failure point occur, an increasing number of the recovery processes are applied. Template 55 is optimized for memory problem error 120. Two flush cache recovery processes are listed first, the second one has a higher severity of flush. Next, two data structure recovery processes are listed, the second one has a higher severity. Next, is a high severity cancel transaction recovery process, followed by a safe mode recovery process.

With reference to FIGS. 10A-10E, the changing states of an example application registration table 42A and recovery record 54A are described for the same recurring failure. In this example, the same recurring failure is treated as an error within a set of error codes (errors 120, 122, and 124). The failure point is defined by a time range of +/−10 seconds after the last checkpoint 'X'. Referring to FIG. 10A, the initial states of an application registration table 42A and recovery record 54A are shown with a record field, as per the template record. Application 32 has registered with the recovery system. Application registration table 42A has recorded that error 120 occurred 30 seconds after the last checkpoint 'X' (i.e., checkpoint 'X+30'). In response to error 120 a new VM 30 with a new application 32 is launched. Before the corresponding fail point (30 seconds) has elapsed, hypervisor 26A interrupts application 32 and application recovery process 600 is called (in this example ten seconds before the impending failure). Since no existing recovery record is found a recovery record MA is created from template 54.

Referring to FIG. 10B, application recovery process 600 performs a first recovery process in recovery record 54A (i.e., cancel transactions 1 (severity 1) and timestamps the operation at 16/3/2011 X+20 (ten seconds before the previous failure point). To determine whether a recovery process has been successful, a failure point timer is started to see if the same error occurs at the same (or similar) time after the checkpoint. If the same error does not occur at the same (or similar) time after the checkpoint then the recovery process or processes are marked as successful in recovery record 54A by introducing a semicolon after the timestamp. That is, the semicolon suffix indicates that the 'cancel transactions 1' recovery process was successful.

Referring to FIG. 10C, application 32 appears to have had another error 120 within a similar range of the same checkpoint time (i.e., 'X+32' is two seconds different but within an example range). These factors may be used to identify recovery record 54A as an existing recovery record for error 120. In this example, 'cancel transaction 1' was applied and time stamped '17/3/2011 X+22' but application 32 still crashed before it was deemed a success by the recovery timer. As such, no semicolon suffix is added following the timestamp. Referring to FIG. 10D, application 32 is shown to have had an error 122 (a similar error in this example) within a similar range of the same checkpoint time (i.e., 'X+25' is five seconds within an example range). These factors facilitate identifying recovery record 54A as an existing recovery record for error 122. In this example, 'cancel transactions 1' is ignored because it did not work previously and recovery process 'cancel transactions 2' is applied and time stamped '17/3/2011 X+15'. In this case, application 32 still crashed before it was deemed a success by the recovery timer and, as such, no semicolon suffix was added.

Referring to FIG. 10E, application 32 is shown to have had another error 123 (a similar error) within a similar range of the same checkpoint time ('X+35' is five seconds within an example range). These factors facilitate identifying recovery record 54A as an existing recovery record for error 123. In this case, 'cancel transactions 1' and 'cancel transactions 2' are ignored because they have not worked previously and recovery process 'cancel transactions 3' is applied and time stamped '17/3/2011 X+25'. In this case, application 32 did not crash before it was deemed a success and a semicolon suffix was added so that another failure can pick-up on the fact. It should be appreciated that additional recovery processes may be applied, if needed (e.g., flush caches, safe mode, and discard data structures have not been applied in this example but could have been applied separately or in addition to the cancel transaction processes).

Accordingly, techniques have been disclosed herein for managing high-availability of virtual machines. In particular, the disclosed techniques manage checkpoint-based high-availability of a backup virtual machine in the event of an application failure on a primary virtual machine.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for failure monitoring and recovery of an application executing on a virtual machine, comprising:
    executing, by a first virtual machine executing on a data processing system, a first application;
    storing, on a data storage device of the data processing system, machine state information during execution of the first virtual machine at predetermined checkpoints;
    receiving, from the first application, an error message that includes an application error state at a failure point of the first application;
    stopping, by a hypervisor, the first virtual machine in response to the error message;
    creating, by the hypervisor, a copy of the first virtual machine and the first application from the stored machine state information, wherein the virtual machine copy corresponds to a second virtual machine and the application copy corresponds to a second application, and wherein the second virtual machine and the second application are configured to execute from a checkpoint preceding the failure point;
    sending, from the hypervisor, a failure interrupt to the second application before the failure point is reached; and
    initiating, in response to receipt of the failure interrupt by the second application, one or more recovery processes in an attempt to avert the failure point during execution of the second application.

2. The method of claim 1, wherein the recovery processes include one or more of cancelling one or more transactions, cancelling one or more threads, flushing one or more caches, discarding one or more data structures, and selecting a safe operating mode.

3. The method of claim 1, wherein, in response to a failure of the second application coinciding with that of the first application, subsequent recovery processes for the failure are adapted from the one or more recovery processes to increase a probability of avoiding the failure point.

4. The method of claim 3, wherein the adapted recovery processes include a recovery process with increased impact.

5. The method of claim 3, wherein the adapted recovery processes include a new recovery process.

6. The method of claim 3, wherein a new failure causes recovery processes to be selected based on a type of the new failure.

7. The method of claim 1, wherein the state information includes all virtual machine registers and memory for the first virtual machine.

8. The method of claim 1, further comprising:
    monitoring real-time virtual machine and application state information for failure conditions.

9. The method of claim 1, wherein the first virtual machine and the second virtual machine are located on different platforms.

* * * * *